(12) United States Patent
Saad

(10) Patent No.: US 11,870,906 B1
(45) Date of Patent: Jan. 9, 2024

(54) PROVIDING A SECURE ISOLATED ACCOUNT FOR CLOUD-BASED STORAGE SERVICES

(71) Applicant: EMC IP Holding Company LLC, Hopkinton, MA (US)

(72) Inventor: Yossef Saad, Gannei Tikva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 440 days.

(21) Appl. No.: 16/123,551

(22) Filed: Sep. 6, 2018

(51) Int. Cl.
  *H04L 9/32* (2006.01)
  *H04L 9/06* (2006.01)
  *H04L 9/30* (2006.01)

(52) U.S. Cl.
  CPC .......... *H04L 9/3226* (2013.01); *H04L 9/0643* (2013.01); *H04L 9/3073* (2013.01); *H04L 9/321* (2013.01)

(58) Field of Classification Search
  CPC ... H04L 9/3226; H04L 9/0643; H04L 9/3073; H04L 9/321
  See application file for complete search history.

(56) References Cited

U.S. PATENT DOCUMENTS

| | | | |
|---|---|---|---|
| 10,157,275 B1* | 12/2018 | Venkatasamy | G06F 21/42 |
| 2011/0314296 A1* | 12/2011 | Dolgunov | G06F 21/34 |
| | | | 713/185 |
| 2015/0349958 A1* | 12/2015 | Lindell | G06F 21/31 |
| | | | 713/168 |
| 2017/0142082 A1* | 5/2017 | Qian | G06F 21/62 |
| 2017/0230179 A1* | 8/2017 | Mannan | H04L 9/3226 |
| 2018/0316658 A1* | 11/2018 | Bartlett | H04W 12/041 |
| 2018/0357447 A1* | 12/2018 | Chen | G06F 16/211 |

\* cited by examiner

*Primary Examiner* — Trang T Doan
*Assistant Examiner* — Vladimir I Gavrilenko
(74) *Attorney, Agent, or Firm* — Dergosits & Noah LLP; Todd A. Noah

(57) ABSTRACT

Described is a system (and method) that provides a mechanism for guarding against cyber-attacks including ransomware, malware, and various other types of malicious attacks. The mechanism includes providing an isolated storage recovery account within a cloud-based storage infrastructure. The isolated storage recovery account secures data even in instances where credentials for a subscriber to a cloud-based service or the cloud-based provider itself is compromised. In order to ensure that data is still protected even when access credentials may be compromised (e.g. by a disgruntled employee), the mechanism requires a joint coordination between both the provider and the subscriber. The joint coordination may be mandated by the use of a particular multiple encryption technique for credentials that are required to access the isolated storage recovery account.

18 Claims, 6 Drawing Sheets

US 11,870,906 B1

PROVIDING A SECURE ISOLATED ACCOUNT FOR CLOUD-BASED STORAGE SERVICES

TECHNICAL FIELD

This disclosure relates to a system that provides a secure isolated storage account, and more particularly, provides a secure isolated storage account as part of a cloud-based storage service.

BACKGROUND

Organizations often subscribe to storage as a service (e.g. cloud service) to store data and perform workloads. However, similar to on premises storage solutions, organizations are often concerned with data protection and recovery. Data protection and recovery contemplates many scenarios including malicious attacks on data such as from ransomware or malware attacks. Such malicious attacks often attempt to circumvent access controls by comprising credentials to one or more storage accounts. For example, such malicious actions may rely on weak passwords and/or social engineering, but in many cases are performed by disgruntled employees that utilize their network access to delete or corrupt data. With on premises storage solutions, the system may create an "airgap" that may disconnect protected data from the production or backup environments. This airgap may be implemented by a physical switch or by disconnecting a network connection using other means. Accordingly, even if a malicious user infiltrates the production or backup environment, they cannot pass the airgap to compromise the protected data. Accordingly, even if they delete or corrupt the production or backup data, there is usually a recovery account that stores the protected data behind an airgap. Such an airgap, however, may not be available in storage environments that are provided within a cloud infrastructure, for example, when an organization does not control the underlying hardware infrastructure. Accordingly, there is a need to provide a secure storage recovery mechanism that cannot be accessed even when certain access credentials are compromised.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
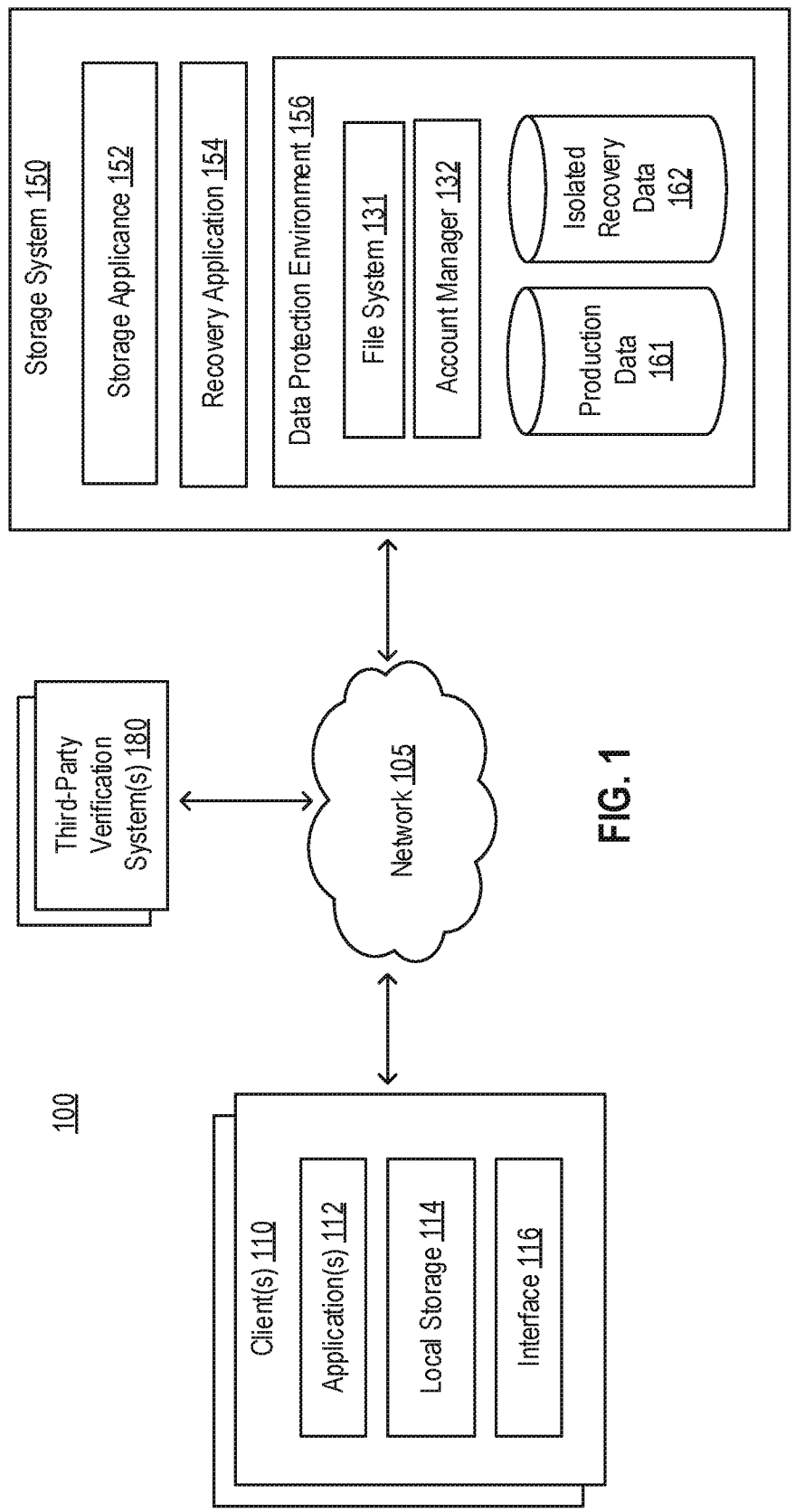
FIG. 1 is a block diagram illustrating an example of an operating environment for creating and accessing an isolated storage account for data recovery according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) directed to guarding against cyber-attacks by providing a recovery mechanism for critical data in defense against ransomware, malware, and various other types of malicious attacks. More specifically, in some embodiments, described is a system (and method) for providing an isolated storage recovery account within a cloud-based storage infrastructure. For example, the isolated storage recovery account secures data even in instances where credentials for a subscriber to a storage service or the cloud-based storage provider itself is compromised.

In order to ensure that data is still protected even when access credentials may be compromised (e.g. known by a disgruntled employee), the mechanism requires a joint coordination between both the custodian (e.g. a storage service provider such as a cloud storage service provider) and a subscriber (e.g. cloud service customer). For example, the joint coordination may be mandated by the use of particular encryption techniques for credentials that are required to access the isolated storage recovery account. In one embodiment, the encryption technique includes encrypting a password required to access the isolated storage account multiple times. In particular, upon creating an isolated storage recovery account, the provider (or custodian) may create a password that is not shared or accessible to subscriber and encrypt such a password with both the public key of the subscriber and a public key of the provider. Accordingly, a disgruntled employee of either the subscriber or the provider would not be able to access the account without coordination with the other party. In other words, only a joint coordination between both the subscriber and the provider (or custodian) can enable access to the isolated storage recovery account.

Accordingly, described is a secure mechanism for providing an isolated account for data recovery. As further described, such a mechanism may be provided within an operating environment. An example of such an operating environment is further described herein with reference to FIG. 1. However, in general, embodiments of the disclosure may include and/or be implemented in an operating environment including a cloud services environment that may be, or include, a data protection system operating environment that includes a storage system or storage environment including primary storage and data protection storage. For example, at least some functionality may be provided by, or implemented in connection with, various platforms such as the Dell-EMC DataDomain data protection platform, and associated systems, methods, and components, although use of this particular platform is provided only by way of illustration and is not required.

In one embodiment, the storage environment may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as datastores such as Oracle databases for example. The applications on the clients may generate new and/or modified data that is desired to be protected.

Any of the devices, including the clients, servers and hosts, in the operating environment can take the form of software, physical machines, or virtual machines (VM), or could be implemented as a Function-as-a-Service (FaaS), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), or could be implemented as a Function-as-a-Service (FaaS), though no particular component implementation is required for any embodiment. Where VMs are employed, a hypervisor or other virtual machine monitor (VMM) can be employed to create and control the VMs.

FIG. 1 is a block diagram illustrating an example of an operating environment 100 for creating and accessing an isolated storage account for data recovery according to one or more embodiments of the disclosure.

As shown, the operating environment 100 may include a client(s) 110 that may be associated with a subscriber (or customer) of a storage service (e.g. cloud storage service), a storage system 150 that may be associated with a storage service provider (e.g. cloud storage service provider), and one or more various types of third-party verification system(s) 180, all of which may interact via a network 105. The network may be any type of wired or wireless network including a local area network (LAN), a wide area network (WAN), or a direct communication link, or other suitable connection.

Client 110 may host one or more applications 112, and may include local storage 114, as well as an interface 116 for communicating with other systems and devices, such as the storage system 150. In general, the applications 112 may create new and/or modified data that is desired to be protected. As such, the client 110 is an example of a host device. A client 110 may take the form of a VM. In general, the VM is a virtualization of underlying hardware and/or software and, as such, the client 110 may include or otherwise be associated with various underlying components. The local storage 114 can be used to locally store data, which may be backed up as disclosed herein. The backup data can be restored to the local storage 114. While not specifically indicated, the client 110 may include a backup client application that cooperates with storage system 150, to create backups of client data, which may include production data 161 and/or isolated recovery data 162 as further described herein. As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

The storage system 150, may include a storage appliance 152 (e.g. Dell-EMC CloudBoost appliance). Accordingly, backup data may be communicated from the client 110 to the storage appliance 152 for initial processing, after which the processed backup data is uploaded from the storage appliance 152 for storage at the data protection environment 156. For example, a backup application may cooperate with a backup client application of the client 110 to back up client data to the data protection environment 156. A backup application may also cooperate with a backup client application to restore backed up data from the data protection environment 156 to the client 110, for example, after accessing an isolated data recovery account as further described herein. The storage appliance 152 may provide a variety of useful functionalities such as source-side data deduplication, data compression, and WAN optimization boost performance and throughput while also possibly reducing the consumption and cost of network bandwidth and cloud storage capacity. One, some, or all, of these functions of the storage appliance 152 can be performed using deduplication logic.

The data protection environment 156 may include one or more instances of a filesystem 131 that catalogues files and other data residing in the data protection environment 156. The data protection environment 156 may store various types of data, for example, including production data 161 and isolated data recovery 162. In general, the storage of data is configured to store client data backups that can be restored in the event of a loss of data. The term data backups is intended to be construed broadly and includes, but is not limited to, partial backups, incremental backups, full backups, clones, snapshots, any other type of copies of data, and any combination of the foregoing. Any of the foregoing may, or may not, be deduplicated. The storage of data can employ any suitable storage technique, infrastructure, hardware (e.g.

Solid State Drive (SSD), Hard Disk Drive (HDD)), or on virtual storage systems provided by a cloud service provider etc.

Access to the various types of data may be controlled by an account manager 132. For example, a subscriber to a cloud storage service may have various accounts that require verification (or authentication) of credentials in order to be granted access to the data. For example, as further described herein, an isolated storage recovery account may require decryption of a password in order to be granted access to the isolated recovery data 162.

A recovery application 154 may be used to create and administer access to an isolated storage recovery account as further described herein. For example, the recovery application 154 may be associated with a subscriber that may access an isolated storage recovery account to retrieve isolated recovery data 162.

The operation environment 100 may also include a third-party verification system(s) 180. A third-party verification system 180 may be accessed or provide a service in order to authenticate a particular user or subscriber (or customer, organization, etc.).

As further described, the secure recovery mechanism may require interaction and coordination between a subscriber and a provider.

Figure 2:
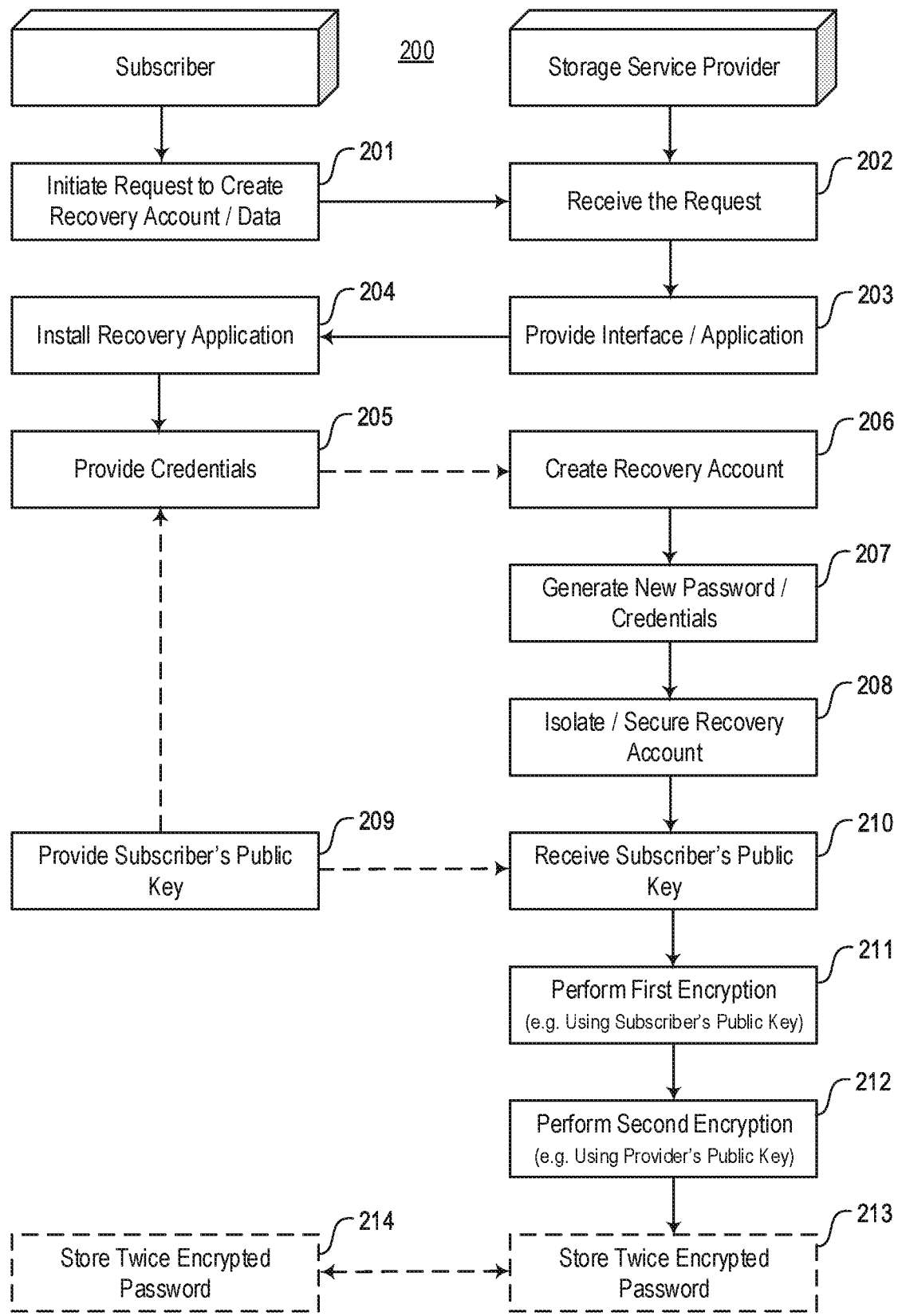
FIG. 2 is a flow diagram illustrating an example interaction between a subscriber and storage service provider for creating an isolated storage recovery account according to one or more embodiments of the disclosure.

FIG. 2 is a flow diagram illustrating an example interaction between a subscriber and storage service provider for creating an isolated storage recovery account according to one or more embodiments of the disclosure.

Shown is an example interaction 200 of a subscriber/organization (e.g. via a client device 110) interacting with a storage service provider (e.g. storage system 150) in order to create an isolated storage recovery account (or recovery account). In 201, the subscriber may initiate a request to create a recovery account. This request may be provided directly from a client device, for example, when a subscriber is connected to a cloud storage service application. In 202, the storage service provider (or provider) may receive the request, for example, via a cloud storage service application. In response to the request, in 203, the provider may provide an interface/application that may be used to create the recovery account.

In one embodiment, the provider may provide an interface that is part of an existing cloud-storage application (or API, command line interface, etc.), or the provider may provide an application, such as a specialized recovery application (e.g. recovery application 154), that may be installed by the subscriber in 204. The recovery application may be installed on the storage system such as on an instance (e.g. virtual machine) associated with subscriber, or on a client device itself associated with the subscriber. In any event, the recovery application or interface may then be used to provide credentials for the recovery account in 205. The credentials may include authenticating information to authorize the creation of a recovery account such as a password, biometric information, a certificate, etc. In addition, the credentials may also include information that is used to access and/or create (or register) the recovery account such as an initial password (I). In response to receiving the initial password (I) or other credentials, the provider may create the recovery account for the subscriber in 206. The recovery account may use an existing tool (e.g. via the storage appliance 152) to provide a scheduled redundant storage of the subscriber's data stored as part of a cloud storage service. For example, the recovery account may copy data from a subscriber's production or backup environment (e.g. by using Dell EMC Cloud Snapshot Manger tool/service) and store such data as recovery data (e.g. isolated recovery data 162). In one embodiment, the tool may be granted only limited access permissions for the recovery account. For example, the limited access permissions may include permission to only write data, and no permissions to read, modify, or delete data. At this point, the recovery account may be accessible by the subscriber using the provided credentials (e.g. initial password (I)).

In order to further secure the recovery account, the provider may perform an additional processing. In one embodiment, the provider may secure and/or isolate the recovery account by changing the initial password to a newly generated password in 207. The provider may generate a new password (P) that is sufficiently secure. The new password (P) may be generated using any suitable technique. For example, new password (P) may be generated using a random number generator (e.g. random.org) to create a sufficiently strong password that meets the criteria specified by the provider. In 208, the provider may secure/isolate the recovery account so that it is no longer accessible by the subscriber, and by extension, a user associated with the subscriber (e.g. a potentially disgruntled employee). For example, a malicious user may gain unauthorized access (or may already have access to) to various subscriber accounts (e.g. administrative accounts). In order to secure/isolate the recovery account, the provider may replace the credentials provided by the subscriber with credentials that are not known, shared, or provided, etc. to the subscriber. In one embodiment, the provider may replace the initial password (I), with the newly generated password (P). In one embodiment, the provider may replace the initial password using various tools or APIs associated with the recovery application. For example, only the provider may have access to such an API.

Accordingly, at this point, the recovery account is protected from a malicious user that has compromised the subscriber (e.g. obtains password I). However, a malicious user that has compromised the provider may still have access to the newly generated password (e.g. obtains password P), and hence, have access to the recovery account. Accordingly, the provider may perform additional processing to ensure the security of the recovery account from a malicious user that has comprised either the subscriber or the provider. Specifically, the provider may encrypt the password P using an encryption function $F_k(x)$. The encryption function may include any suitable encryption algorithm (e.g. Advanced Encryption Standard (AES), Secure Hash Algorithm (SHA), etc.) with various bit lengths and variants. As further described herein, to provide the necessary security, the provider may twice encrypt the newly generated password (P).

Accordingly, to further secure the account, the subscriber may provide to the provider a public key (K11) of a public/private key pair associated with the subscriber. The private key (K21) of the public/private key pair associated with the subscriber would remain secure (e.g. not shared with the provider). The subscriber's public key (K11) may be provided as part of the subscriber providing credentials in 205. Alternatively, the subscriber's public key (K11) may be provided as a separate process or transmission in 209 (e.g. after an additional verification/authentication). In addition, the subscriber's public key (K11) may be obtained from a third-party source such as from a trusted certification service or Certificate Authority (CA). Accordingly, in 210, the provider may receive the subscriber's public key (K11). Once the provider has obtained subscriber's public key (K11), in 211, the provider may perform a first encryption by encrypting password P with K11 to generate an encrypted password (S). For example, the provider may initiate the generation of $S=F_{K11}(P)$. In addition, the provider may perform a second encryption by encrypting S again with the public key (K21) of a public/private key pair associated with the provider. The private key (K21) of the public/private key pair associated with the provider would remain secure (e.g. not shared with the subscriber). Accordingly, in 212, the provider may perform a second encryption by encrypting password (S) with K21 to generate a twice encrypted password (S'). For example, the provider may initiate (or perform) the generation of $S'=F_{K21}(F_{K11}(P))$. Accordingly, the password may be twice encrypted with both public keys of the subscriber and the provider. Thus, at this point, the twice encrypted password (S'), and hence the recovery account, is protected from a malicious attack on either of the subscriber or the provider. In other words, as long as one of the subscriber's private key (K21) or the provider's private key (K22) remains secure, the isolated storage recovery account remains secure.

This twice encrypted password (S') may then be stored with the provider as shown in 213, and/or with the subscriber as shown in 214. In addition, the twice encrypted password (S') may be stored with the subscriber and with the provider as a failsafe in case one of the versions is lost or corrupted. In addition, the twice encrypted password (S') may be stored with a third-party, or a third-party service, which may then require an additional authorization by a third-party service when acquiring (S') for recovery purposes. Accordingly, the third-party service may provide yet another layer of security. In addition, the above process may be periodically repeated based on a password expiration policy implemented by the provider and/or the subscriber.

Figure 3:
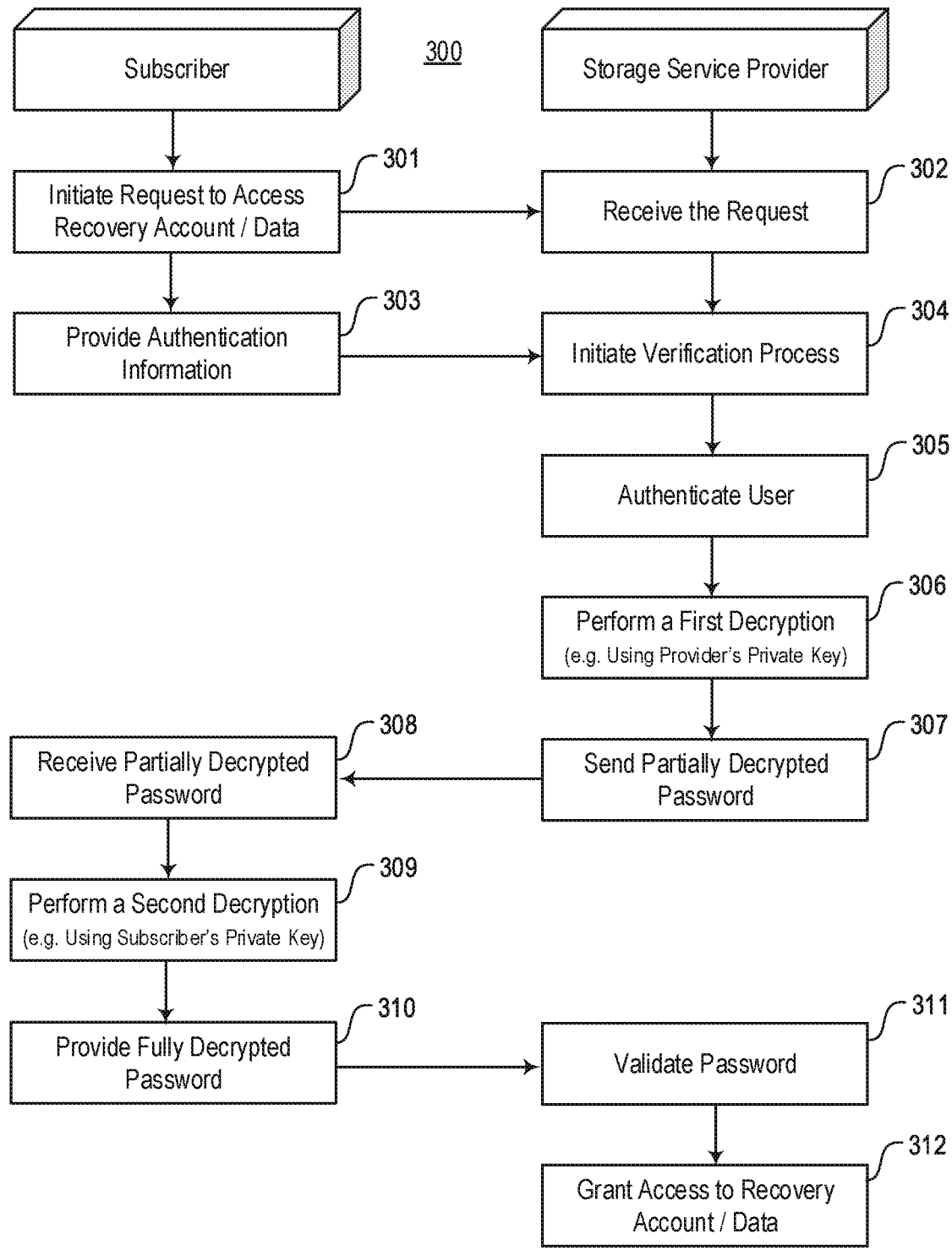
FIG. 3 is a flow diagram illustrating an example interaction between a subscriber and storage service provider for accessing the isolated storage recovery account to recover data according to one or more embodiments of the disclosure.

FIG. 3 is a flow diagram illustrating an example interaction between a subscriber and storage service provider for accessing the isolated storage recovery account to recover data according to one or more embodiments of the disclosure.

Shown is an example interaction 300 of a subscriber/organization (e.g. via a client device 110) interacting with a storage service provider (e.g. storage system 150) in order to access the created isolated storage recovery account (or recovery account). In 301, the subscriber may initiate a request to access the isolated storage recovery account. For example, the subscriber may need to recover data in response to a particular event (e.g. data recovery event), and accordingly, may request access to the isolated storage recovery account (e.g. access to the isolated recovery data 162 maintained by the isolated storage recovery account). In 302, the storage service provider (or provider) may receive the request to access the recovery account. For example, the request may be received via the interface or the recovery application (e.g. recovery application 154). For example, the request to may be received via the recovery application that was downloaded (on a client device or the storage system) for creating the recovery account. In 303, the subscriber may provide authentication information to the provider. In 304, the provider may initiate a verification process to verify the request is received from an authorized source.

The verification process may include authenticating a user (e.g. a user associated with the subscriber) has authority to access the recovery account. The verification may include performing a manual verification of one or more of the subscriber and the provider. This verification process is intended to guard against computer-generated attacks or vulnerabilities that a malicious party may compromise. In one embodiment, the authentication may include providing recovery access credentials that are stored or maintained in a manner separate from the passwords, or keys of the subscriber. For example, the recovery access credentials (e.g. password or passphrase) may be stored offline (e.g. stored only in written form). In addition, the authentication may include providing information to a third-party that authenticates the user or subscriber requesting access to the recovery account.

Accordingly, in 304, the provider may authenticate the user or subscriber to verify the user or subscriber is authorized to access the recovery account. In response to performing the authentication, the provider may initiate a decryption of the twice encrypted password (S'). Accordingly, in 306, the provider may perform a first decryption of (S') to obtain (S), which is a partial (or first) decryption of (S'). The provider may perform the first decryption of (S') using private key (K22) of the public/private key pair associated with the provider. For example, the provider may decrypt (S') using the inverse of F (i.e. $F^{-1}$). For example, the provider may initiate (or perform) a first decryption to generate $S=F^{-1}_{K22}(S')$. Accordingly, in 307, the provider may send the partially decrypted password (S) to the subscriber. In 308, the subscriber may receive the partially decrypted password (S). In response, the subscriber may fully decrypt the partially decrypted password (S) in 309. The subscriber may perform the decryption of S (e.g. second decryption, or full decryption) using private key (K21) of the public/private key pair associated with the subscriber. For example, the subscriber may initiate (or perform) a second decryption to generate $P=F^{-1}_{K12}(S)$. At this point, the subscriber now has obtained password (P) that was generated by the provider during the creation of the account. In 310, the subscriber may provide the twice decrypted password (P) as part of an authentication to gain access the recovery account. For example, a user associated with the subscriber may enter password (P) into an interface or the recovery application, and in response to validating the password (P) in 311, the provider may grant access to the recovery account in 312, which in turn allows the subscriber to access the isolated recovery data 162.

Figure 4:
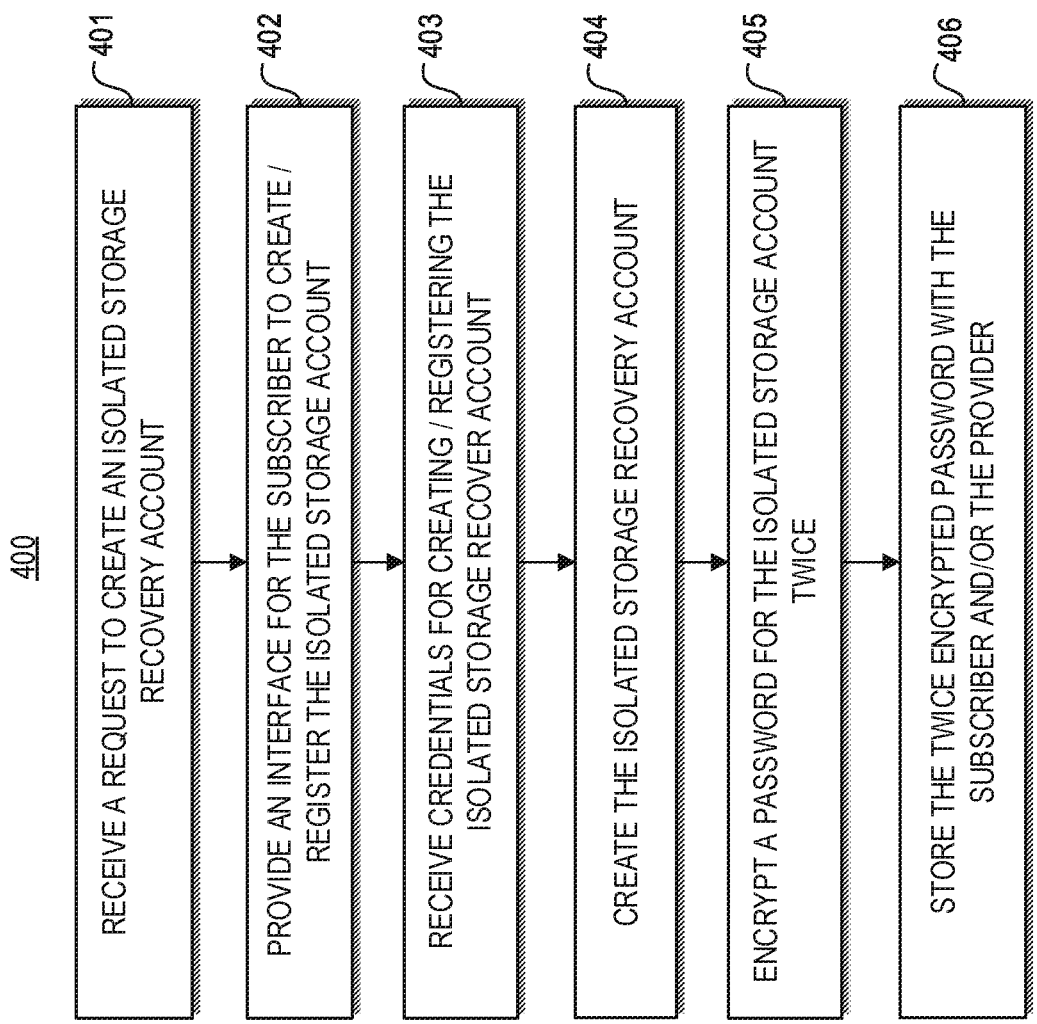
FIG. 4 is a flow diagram illustrating an example method of providing an isolated storage recovery account according to one or more embodiments of the disclosure.

FIG. 4 is a flow diagram illustrating an example method of providing an isolated storage recovery account according to one or more embodiments of the disclosure. Process 400 may use processing logic, which may include software, hardware, or a combination thereof. For example, process 400 may be performed by a system including one or more components described in operating environment 100 (e.g., storage system 150).

In 401, the system may receive a request to create the isolated storage recovery account for the subscriber. As described, the system may be associated with a cloud storage service provider and the request may be received from a first device associated with a cloud storage service subscriber. Accordingly, the account may be created as part of a cloud storage service. The cloud storage service may include continuously copying data of the subscriber from a production account (e.g. production data 161) to the isolated storage recovery account (e.g. isolated recovery data 162). For example, the copying data may be part of a disaster or malicious attack recovery mechanism. For example, one such example may include Dell EMC cloud manager service. In addition, in some embodiments, the tool or restrictions on the isolated storage recovery account may limit access permissions such as write only, and no permission to read, modify, or delete stored data.

In 402, the system may provide an interface for the subscriber to register the isolated storage recovery account.

In one embodiment, the provider may provide an interface that is part of an existing cloud-storage application (or API, command line interface, etc.), or the provider may provide an application, such as a specialized recovery application (e.g. recovery application 154), that may be installed by the subscriber.

In 403, the system may receive credentials for registering the isolated storage recovery account (or recovery account). For example, the credentials may be received from the first device and via the interface. The credentials may include a public key of a public/private key pair associated with the subscriber.

In 404, the system may create (or register, verify, etc.) the isolated storage recovery account. The system may create the recovery account using the credentials provided by the subscriber. In addition, as part of the creation process, or in a separate process, the system may initiate the generation of a password for accessing the isolated storage recovery account. In order to maintain the isolation of such an account, the system may generate and store the password in a manner so as to not be accessible or shared with the subscriber.

In 405, the system may encrypt the password at least twice. The encrypting may include encrypting the password with the received first public key of the public/private key pair associated with the subscriber. In addition, the encrypting may include encrypting the password with a second public key of public/private key pair associated with the provider. Accordingly, the system may create a twice encrypted password. In one embodiment, the provider may first encrypt the password with the subscriber's public key, and then with the provider's public key.

In 406, the system may store the at least twice encrypted password in a secure storage accessible by at least one of the subscriber and the provider. In addition, in one embodiment, the twice encrypted password may be stored with a third-party.

Figure 5:
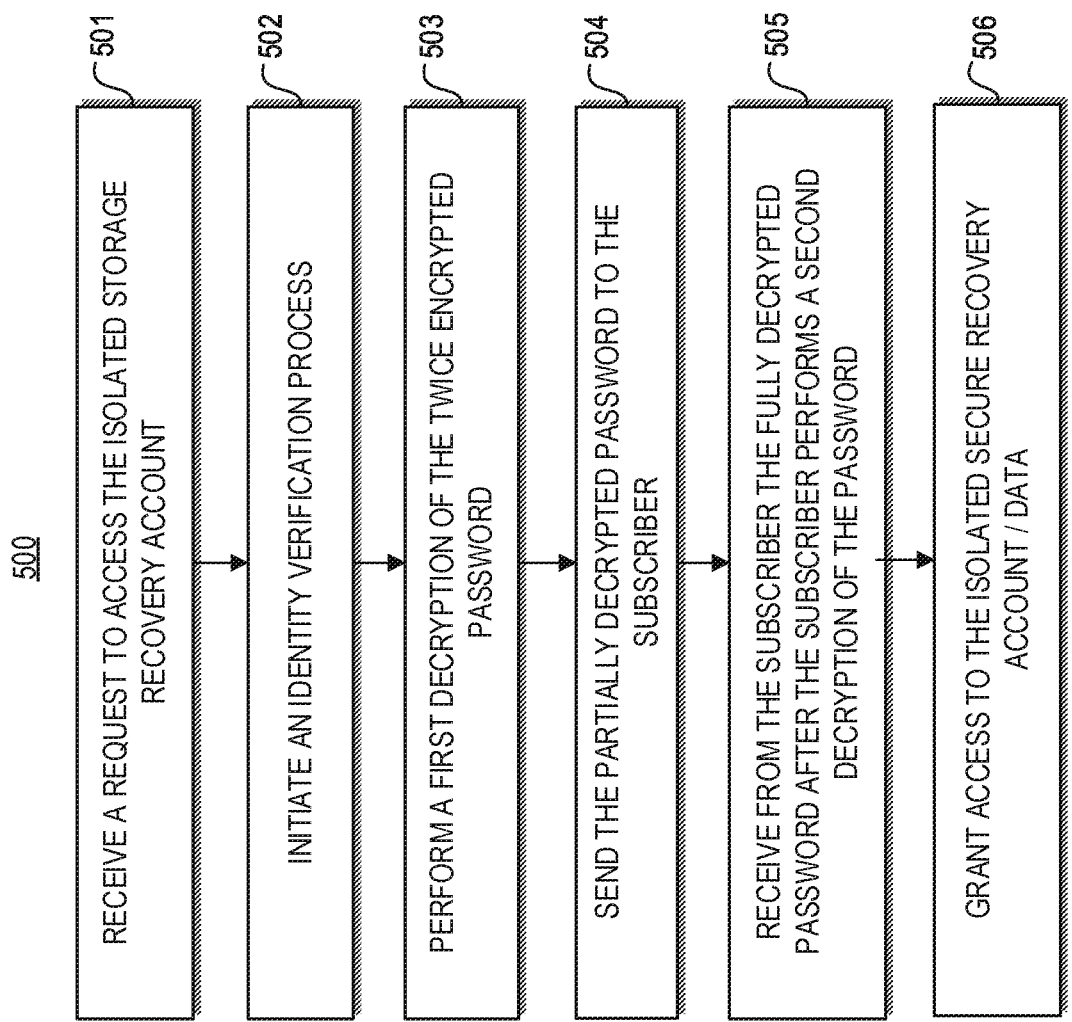
FIG. 5 is a flow diagram illustrating an example method of accessing an isolated storage recovery account according to one or more embodiments of the disclosure.

FIG. 5 is a flow diagram illustrating an example method of accessing an isolated storage recovery account according to one or more embodiments of the disclosure. Process 500 may use processing logic, which may include software, hardware, or a combination thereof. For example, process 500 may be performed by a system including one or more components described in operating environment 100 (e.g., storage system 150).

In 501, the system may receive, from a second device associated with the subscriber, a request to access the isolated storage recovery account by the subscriber. The second device may be the same, or different, device (e.g. first device) that initially requested or created the secure isolated account.

In 502, the system may initiate a verification process to verify the request is received from an authorized source. In one embodiment, the verification process may include performing a verification using a third-party service (e.g. third-party system 180). For example, the subscriber may send authentication information directly to the third-party service for verification, and the provider may trust the authenticity of the subscriber upon receiving a confirmation from the third-party service. For example, subscriber may provide a secret password that is only in hand written or printed form (e.g. not stored electronically), to guard against a computing system or device being compromised.

In 503, the system, in response to verifying the request is received from the authorized source, may decrypt the at least twice encrypted password. The decrypting may include partially decrypting the password with a first private key of the public/private key pair associated with the provider. In 504, the system may send the partially decrypted password to the second device associated with the subscriber. In 505, the system may receive from the subscriber the password after the second device fully decrypts the password with the private key of the public/private key pair associated with the subscriber. In 506, the system may authorize access to the secure recovery storage account by the subscriber in response to receiving the password.

Accordingly, in some embodiments described above, described is a mechanism for providing a secure isolated storage account that provides protection against various forms of cyber-attacks.

Figure 6:
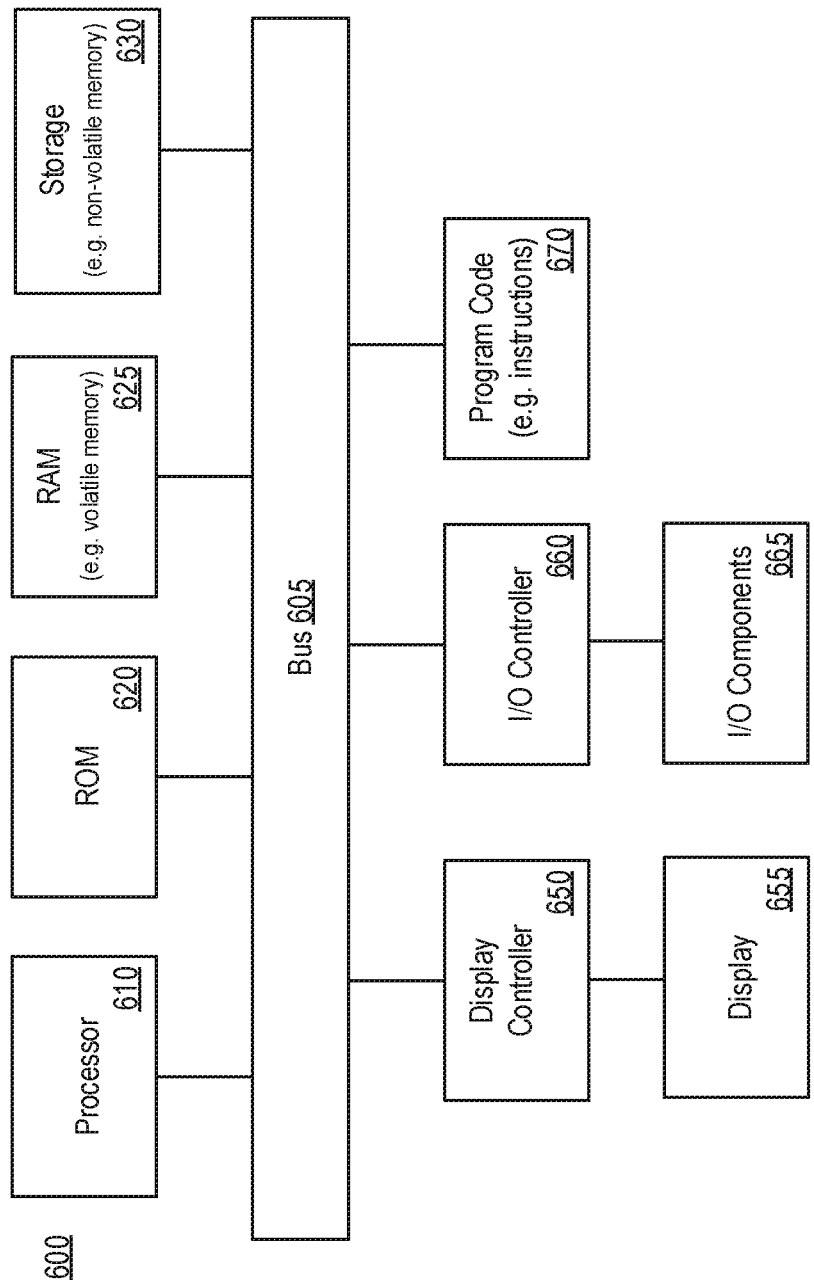
FIG. 6 is a block diagram illustrating an example of a computing system that may be used in conjunction with one or more embodiments of the disclosure.

FIG. 6 shows a block diagram of an example of a computing system that may be used in conjunction with one or more embodiment. For example, computing system 600 (or system, or server, or computing device, or device) may represent any of the devices or systems (e.g., storage system 150, or client 110, etc.) described herein that perform any of the processes, operations, or methods of the disclosure. Note that while the computing system 600 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 605 which may be coupled to a processor 610, ROM (Read Only Memory) 620, RAM (or volatile memory) 625, and storage (or non-volatile memory) 630. The processor 610 may retrieve stored instructions from one or more of the memories 620, 625, and 630 and execute the instructions to perform processes, operations, or methods described herein. These memories represent examples of a non-transitory computer-readable medium (or machine-readable medium, or storage) containing instructions which when executed by a processor (or system, or computing system), cause the processor to perform operations, processes, or methods described herein. The RAM 625 may be implemented as, for example, dynamic RAM (DRAM), or other types of memory that require power continually in order to refresh or maintain the data in the memory. Storage 630 may include, for example, magnetic, semiconductor, tape, optical, removable, non-removable, and other types of storage that maintain data even after power is removed from the system. It should be appreciated that storage 630 may be remote from the system (e.g., accessible via a network).

A display controller 650 may be coupled to the bus 605 in order to receive display data to be displayed on a display device 655, which can display any one of the user interface features or embodiments described herein and may be a local or a remote display device. The computing system 600 may also include one or more input/output (I/O) components 665 including mice, keyboards, touch screen, network interfaces, printers, speakers, and other devices. Typically, the input/output components 665 are coupled to the system through an input/output controller 660.

Program code 670 (or modules, instructions, components, subsystems, units, functions, or logic) may represent any of the instructions, operations, subsystems, or engines described above. Program code 670 may reside, completely or at least partially, within the memories described above (e.g., non-transitory computer-readable media), or within a processor during execution thereof by the computing system. In addition, program code 670 can be implemented as software, firmware, or functional circuitry within the computing system, or as combinations thereof.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein. Examples of program instructions include both machine code, such as produced by a compiler, and files containing higher-level or intermediate code that may be executed by a computing device such as a server or other data processing apparatus (or machine) using an interpreter.

It should be noted that the term "approximately" or "substantially" may be used herein and may be interpreted as "as nearly as practicable," "within technical limitations," and the like. In addition, the use of the term "or" indicates an inclusive or (e.g., and/or) unless otherwise specified.

Other embodiments of the invention will be apparent to those skilled in the art from consideration of the specification and practice of the invention disclosed herein. It is intended that the specification and examples be considered as examples only, with a true scope and spirit of the invention being indicated by the claims.

What is claimed is:

1. A method comprising:
  receiving, by a server computing system, a request to create an isolated storage recovery account for a first device associated with a subscriber of a cloud storage provider, the isolated storage recovery account managing and maintaining access to a data repository that is separate from a related production data repository;
  providing, by the server computing system, an interface for the subscriber to provide credentials for creating the isolated storage recovery account in response to receiving the request to create the isolated storage recovery account;
  receiving, by the server computing system, credentials for creating the isolated storage recovery account from the first device and via the interface, the credentials including at least a first public key of a first public/private key pair associated with the subscriber;
  creating, by the server computing system, the isolated storage recovery account based upon the credentials, the creating including generating a password for accessing the isolated storage recovery account, the password not being accessible or shared with the subscriber in an unencrypted state;
  encrypting, by the server computing system, the password at least twice, the encrypting including a first encryption of the password with the first public key associated with the subscriber and received from the first device, and a second encryption of the password with a second public key of a second public/private key pair associated with the provider, a first private key of the first public/private key pair not being accessible or shared with the provider and a second private key of the second public/private key pair not being accessible or shared with the subscriber; and
  storing, by the server computing system, the at least twice encrypted password in a secure storage accessible by at least one of the subscriber and the provider, the at least twice encrypted password enabling access to the isolated storage recovery account by joint coordination between the subscriber and the cloud storage provider.

2. The method of claim 1, wherein the interface includes a recovery application installed by the subscriber at the system or on the first device.

3. The method of claim 1, further comprising:
  receiving, by the server computing system, a request to access the isolated storage recovery account from a second device associated with the subscriber;
  initiating, by the server computing system, a verification process to verify the request is received from an authorized source;
  decrypting, by the server computing system, the at least twice encrypted password in response to verifying the request is received from the authorized source, the decrypting including partially decrypting the password with a first private key of the public/private key pair associated with the provider;
  sending, by the server computing system, the partially decrypted password to the second device associated with the subscriber;
  receiving, by the server computing system, the password from the second device via the interface after the second device fully decrypts the password with a second private key of the public/private key pair associated with the subscriber; and
  authorizing, by the server computing system, access to the secure recovery storage account by the subscriber in response to receiving the password.

4. The method of claim 3, wherein initiating the verification process to verify the request is received from an authorized source includes receiving from a third-party service confirmation of an identify of a user associated with the subscriber, the confirmation provided in response to the second device providing identification information to the third-party service.

5. The method of claim 3, wherein the encrypting and decrypting is performed using a symmetric encryption algorithm.

6. The method of claim 5, wherein the symmetric encryption algorithm includes an Advanced Encryption Standard (AES) or Secure Hash Algorithm (SHA) encryption algorithm.

7. A system comprising:
  one or more processors; and
  a non-transitory computer readable medium storing a plurality of instructions, which when executed, cause the one or more processors to:
  receive a request to create an isolated storage recovery account for a first device associated with a subscriber of a cloud storage provider, the isolated storage recovery account managing and maintaining access to a data repository that is separate from a related production data repository;
  provide an interface for the subscriber to provide credentials for creating the isolated storage recovery account in response to receiving the request to create the isolated storage recovery account;
  receive credentials for creating the isolated storage recovery account from the first device and via the interface, the credentials including at least a first public key of a public/private key pair associated with the subscriber;
  create the isolated storage recovery account based upon the credentials, the creating including generating of a password for accessing the isolated storage recovery account, the password not being accessible or shared with the subscriber in an unencrypted state;
  encrypt the password at least twice, the password at least twice, the encrypting including a first encryption of the password with the first public key associated with the subscriber and received from the first device, and a second encryption of the password with a second public key of a second public/private key pair associated with the provider, a first private key of the first public/private key pair not being accessible or shared with the provider and a second private key of the second public/private key pair not being accessible or shared with the subscriber; and store the at least twice encrypted password in a secure storage accessible by at least one of the subscriber and the provider, the at least twice encrypted password enabling access to the isolated storage recovery account by joint coordination between the subscriber and the cloud storage provider.

8. The system of claim 7, wherein the interface includes a recovery application installed by the subscriber at the system or on the first device.

9. The system of claim 7, wherein the plurality of instructions, when executed, further cause the one or more processors to:

receive a request to access the isolated storage recovery account from a second device associated with the subscriber;

initiate a verification process to verify the request is received from an authorized source;

decrypt the at least twice encrypted password in response to verifying the request is received from the authorized source, the decrypting including partially decrypting the password with a first private key of the public/private key pair associated with the provider;

send the partially decrypted password to the second device associated with the subscriber;

receive the password from the second device via the interface after the second device fully decrypts the password with a second private key of the public/private key pair associated with the subscriber; and authorize access to the secure recovery storage account by the subscriber in response to receiving the password.

10. The system of claim 9, wherein initiating the verification process to verify the request is received from an authorized source includes receiving from a third-party service confirmation of an identify of a user associated with the subscriber, the confirmation provided in response to the second device providing identification information to the third-party service.

11. The system of claim 9, wherein the encrypting and decrypting is performed using a symmetric encryption algorithm.

12. The system of claim 11, wherein the symmetric encryption algorithm includes an Advanced Encryption Standard (AES) or Secure Hash Algorithm (SHA) encryption algorithm.

13. A computer program product comprising a non-transitory computer-readable medium having a computer-readable program code embodied therein to be executed by one or more processors, the program code including instructions to:

receive a request to create an isolated storage recovery account for a first device associated with a subscriber of a cloud storage provider, the isolated storage recovery account managing and maintaining access to a data repository that is separate from a related production data repository;

provide an interface for the subscriber to provide credentials for creating the isolated storage recovery account in response to receiving the request to create the isolated storage recovery account;

receive credentials for creating the isolated storage recovery account from the first device and via the interface, the credentials including at least a first public key of a public/private key pair associated with the subscriber;

create the isolated storage recovery account based upon the credentials, the creating including generating of a password for accessing the isolated storage recovery account, the password not being accessible or shared with the subscriber in an unencrypted state;

encrypt the password at least twice, the password at least twice, the encrypting including a first encryption of the password with the first public key associated with the subscriber and received from the first device, and a second encryption of the password with a second public key of a second public/private key pair associated with the provider, a first private key of the first public/private key pair not being accessible or shared with the provider and a second private key of the second public/private key pair not being accessible or shared with the subscriber; and store the at least twice encrypted password in a secure storage accessible by at least one of the subscriber and the provider, the at least twice encrypted password enabling access to the isolated storage recovery account by joint coordination between the subscriber and the cloud storage provider.

14. The computer program product of claim 13, wherein the interface includes a recovery application installed by the subscriber at the system or on the first device.

15. The computer program product of claim 13, wherein the program code includes further instructions to:

receive a request to access the isolated storage recovery account from a second device associated with the subscriber;

initiate a verification process to verify the request is received from an authorized source;

decrypt the at least twice encrypted password in response to verifying the request is received from the authorized source, the decrypting including partially decrypting the password with a first private key of the public/private key pair associated with the provider;

send the partially decrypted password to the second device associated with the subscriber;

receive the password from the second device via the interface after the second device fully decrypts the password with a second private key of the public/private key pair associated with the subscriber; and authorize access to the secure recovery storage account by the subscriber in response to receiving the password.

16. The computer program product of claim 15, wherein initiating the verification process to verify the request is received from an authorized source includes receiving from a third-party service confirmation of an identify of a user associated with the subscriber, the confirmation provided in response to the second device providing identification information to the third-party service.

17. The computer program product of claim 15, wherein the encrypting and decrypting is performed using a symmetric encryption algorithm.

18. The computer program product of claim 16, wherein the symmetric encryption algorithm includes an Advanced Encryption Standard (AES) or Secure Hash Algorithm (SHA) encryption algorithm.

* * * * *